(12) United States Patent
Pan (10) Patent No.: US 9,621,032 B2
(45) Date of Patent: Apr. 11, 2017

(54) GENERATION OF VOLTAGES

(71) Applicant: MICRON TECHNOLOGY, INC., Boise, ID (US)

(72) Inventor: Feng Pan, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/813,883

(22) Filed: Jul. 30, 2015

(65) Prior Publication Data

US 2017/0033683 A1    Feb. 2, 2017

(51) Int. Cl.
*H02M 3/07* (2006.01)
*H03L 5/00* (2006.01)

(52) U.S. Cl.
CPC .......... *H02M 3/07* (2013.01); *H02M 3/073* (2013.01); *H02M 2003/076* (2013.01)

(58) Field of Classification Search
CPC .......... H03K 3/356; H03K 19/018521; H03K 19/00315; H03K 17/102; H03K 3/012; H02M 2003/076
USPC .......... 327/306, 333, 534–540; 326/61–62, 326/80–81
See application file for complete search history.

(56) References Cited

U.S. PATENT DOCUMENTS

| 4,701,634 | A  | * | 10/1987 | Schuetz | H03K 3/3565 327/130 |
| 5,886,566 | A  | * | 3/1999  | Park    | H02M 3/073 327/390 |
| 6,078,212 | A  |   | 6/2000  | Lakhani |  |
| 6,710,585 | B2 | * | 3/2004  | Schmitt | G05F 3/185 323/266 |
| 7,759,985 | B2 | * | 7/2010  | Yanagishima | H02M 1/08 327/108 |
| 8,847,661 | B2 | * | 9/2014  | Choung  | H03K 3/01 326/62 |
| 9,143,092 | B2 | * | 9/2015  | Huijsing | H03F 1/523 |

\* cited by examiner

*Primary Examiner* — Dinh T Le
(74) *Attorney, Agent, or Firm* — Dicke, Billig & Czaja, PLLC (57) ABSTRACT

Voltage generation circuits are useful in the generation of internal voltages for use in integrated circuits. Voltage generation circuits may include a stage capacitance and a voltage isolation device connected to the stage capacitance. The voltage isolation device may include a first current path between an input and an output of the voltage isolation device through a diode, and a second current path between the input and the output of the voltage isolation device through a gate. The gate is responsive to the contribution of a low-pass filter between the output of the voltage isolation device and the gate, and to the contribution of a high-pass filter between a clock signal node and the gate.

23 Claims, 10 Drawing Sheets

GENERATION OF VOLTAGES

TECHNICAL FIELD

The present disclosure relates generally to integrated circuits and, in particular, in one or more embodiments, the present disclosure relates to apparatus for generation of voltages in integrated circuits, e.g., semiconductor memory.

BACKGROUND

Memory devices are typically provided as internal, semiconductor, integrated circuit devices in computers or other electronic devices. There are many different types of memory including random-access memory (RAM), read only memory (ROM), dynamic random access memory (DRAM), synchronous dynamic random access memory (SDRAM), and flash memory.

Flash memory devices have developed into a popular source of non-volatile memory for a wide range of electronic applications. Flash memory devices typically use a one-transistor memory cell that allows for high memory densities, high reliability, and low power consumption. Changes in threshold voltage of the memory cells, through programming (which is often referred to as writing) of charge storage structures (e.g., floating gates or charge traps) or other physical phenomena (e.g., phase change or polarization), determine the data value of each cell. Common uses for flash memory include personal computers, personal digital assistants (PDAs), digital cameras, digital media players, cellular telephones, solid state drives and removable memory modules, and the uses are growing.

Integrated circuit devices generally are powered by two or more externally-supplied voltages, such as Vcc and Vss. In addition to the supply voltages, integrated circuit devices often generate other voltages utilized in the operation of that device. For example, in a memory device, such internally-generated voltages are often utilized during access operations, such as during a read operation, a program operation (often referred to as a write operation), or an erase operation. The internally-generated voltages are often higher or lower than any supply voltage.

Generating other voltage levels from a supply voltage is often performed using a charge pump or other voltage generation circuit. Charge pumps often utilize alternating switched capacitances (e.g., capacitors) to generate a higher or lower voltage from a supply voltage. Power efficiency is often an important consideration in the design and usage of integrated circuit devices, and the generation and transmission of these internal voltages often results in significant power losses.

For the reasons stated above, and for other reasons stated below which will become apparent to those skilled in the art upon reading and understanding the present specification, there is a need in the art for alternative methods of generating and transmitting voltages, and apparatus to perform such methods.

DETAILED DESCRIPTION

In the following detailed description, reference is made to the accompanying drawings that form a part hereof, and in which is shown, by way of illustration, specific embodiments. In the drawings, like reference numerals describe substantially similar components throughout the several views. Other embodiments may be utilized and structural, logical and electrical changes may be made without departing from the scope of the present disclosure. The following detailed description is, therefore, not to be taken in a limiting sense.

Voltage generation circuits typically increase or decrease an input supply voltage in order to provide a higher or lower output voltage, respectively, required to operate circuit elements in integrated circuits. A charge pump is one type of voltage generation circuit typically employed in integrated circuit devices such a non-volatile memory systems. A charge pump typically includes several stages which may each include a stage capacitance which is charged and discharged during a clock cycle of the charge pump. A voltage isolation device may be coupled between the stage capacitance and the stage input voltage to mitigate loss of the developed output voltage of the stage.

One or more clock signals typically trigger the charging of the stage capacitances. A typical clock signal may have a clock frequency with a time period less than the discharge time of the capacitances. In one such design, two clock signals having opposite phase trigger the charging of alternate stages of a multi-stage charge pump.

Figure 6A:
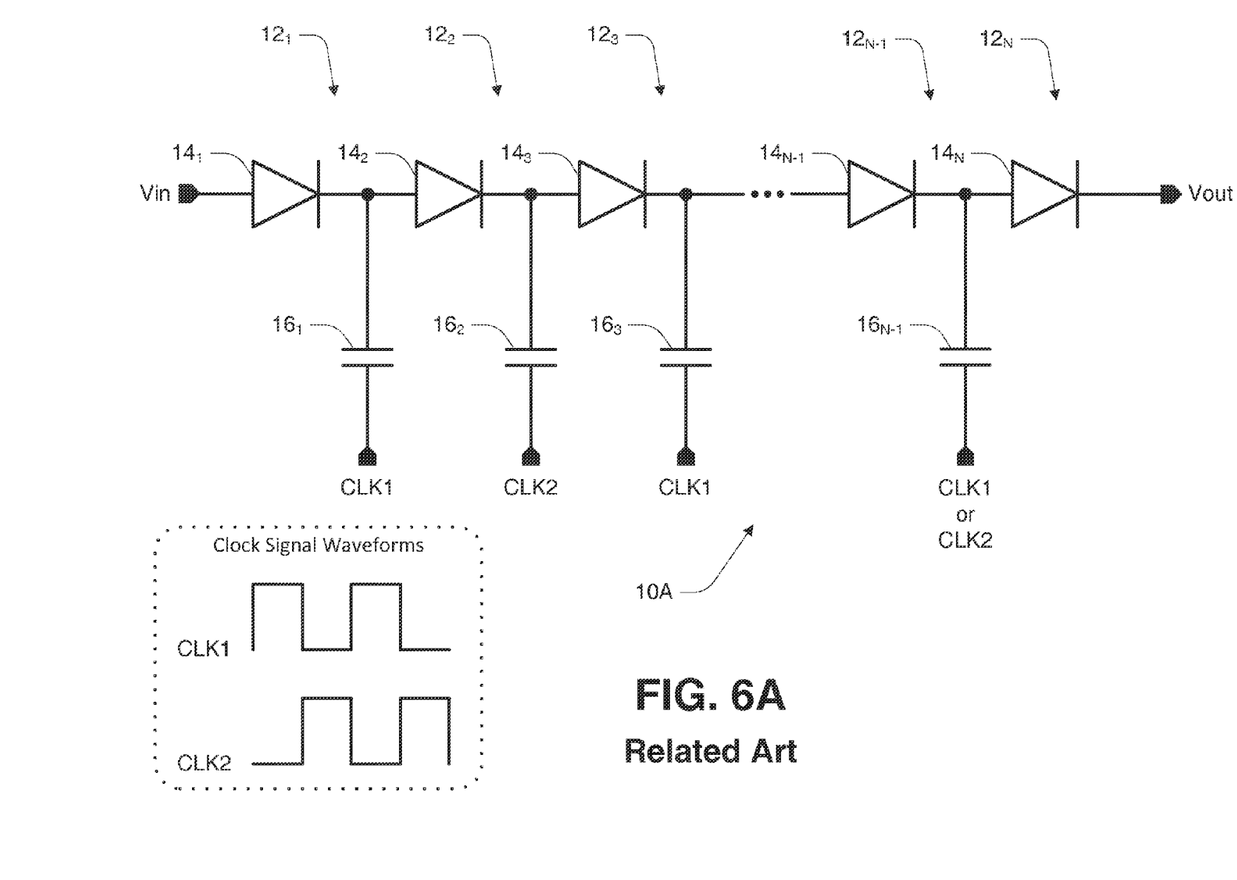
FIGS. 6A-6B are schematics of conventional voltage generation circuits.

An example of a conventional charge pump 10A is illustrated schematically in FIG. 6A as one example of a voltage generation circuit. Charge pump 10A may be a positive charge pump, e.g., developing an increasing voltage level at its output.

Charge pump 10A receives an input voltage Vin, which might be Vcc for example. A first clock signal CLK1 may be received at one input (e.g., electrode) of alternating stage capacitances, e.g., stage capacitances $16_1$, $16_3$, $16_5$, etc., while a second clock signal CLK2 may be received at one input (e.g., electrode) of alternating stage capacitances, e.g., stage capacitances $16_2$, $16_4$, $16_6$, etc. While stage capacitances $16_4$, $16_5$ and $16_6$ are not directly shown in FIG. 6A, it is apparent from the numbering of stage capacitances 16 from 1 to N. Clock signals CLK1 and CLK2 would generally have opposite phases, the same frequency, and similar (e.g., the same) amplitudes, which may correspond to the amplitude of a supply voltage.

Charge pump 10A may include N stages 12. The stages $12_1$ through $12_N$ may each include a stage capacitance 16. The stages $12_1$ through $12_N$ may further include a voltage isolation device 14, e.g., a diode. The Nth stage $12_N$ of the charge pump 10A may contain voltage isolation device $14_N$ without a corresponding stage capacitance 16. The voltage isolation device $14_N$ may be included to protect a load, e.g., circuitry configured to receive the output voltage Vout. In the charge pump 10A, the voltage isolation devices 14 may generally mitigate charge or discharge of the stage capacitances 16 between cycles of their respective clock signal CLK1 or CLK2. Thus, the charge pump 10A may progressively store more charge on the capacitance component of each stage, and several such stages being placed together in the charge pump 10A can produce an increasing voltage level.

Figure 6B:
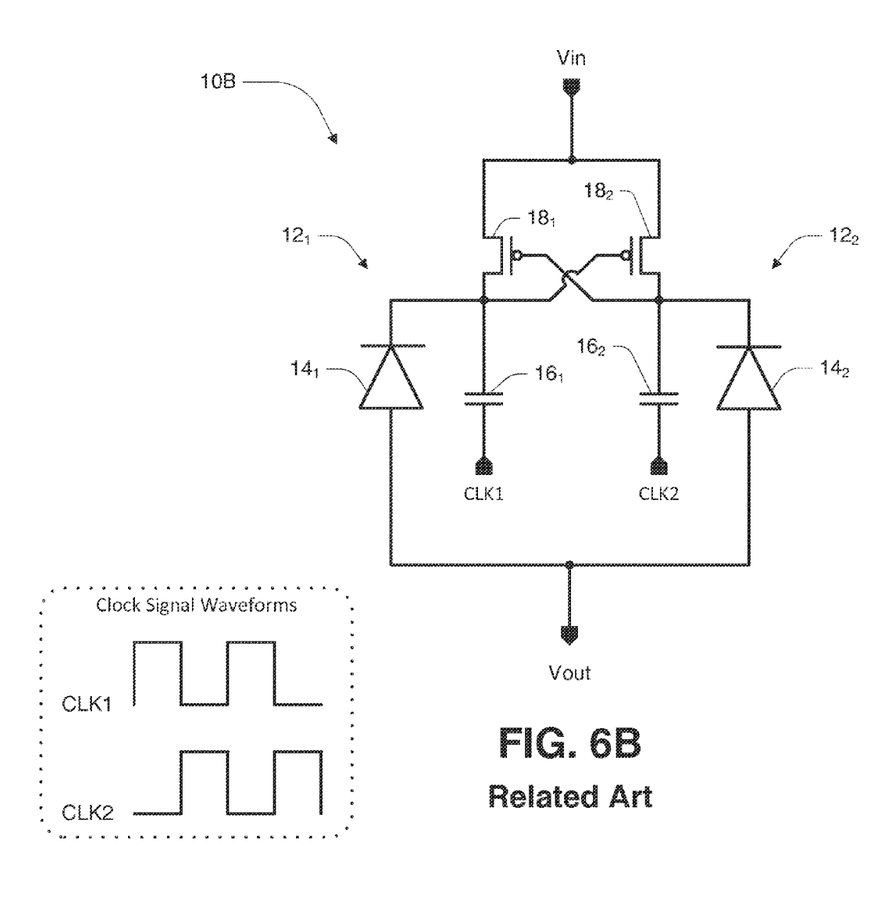

Another example of a conventional charge pump 10B is illustrated schematically in FIG. 6B as another example of a voltage generation circuit. Charge pump 10B may be a negative charge pump, e.g., developing a decreasing voltage level at its output.

Charge pump 10B receives an input voltage Vin. A first clock signal CLK1 may be received at one input of stage capacitance $16_k$, while a second clock signal CLK2 may be received at one input of stage capacitance $16_2$. Clock signals CLK1 and CLK2 would generally have opposite phases, the same frequency, and similar (e.g., the same) amplitudes, which may correspond to the amplitude of a supply voltage.

Charge pump 10B might include two parallel stages 12. The stages $12_1$ and $12_2$ may each include a stage capacitance $16_1$ and $16_2$, respectively. The stages $12_1$ and $12_2$ may further include a voltage isolation device $14_1$ and $14_2$, respectively, e.g., a transistor configured to function as a diode. The voltage isolation devices 14 may be included to protect a load, e.g., circuitry configured to receive the output voltage Vout. In the charge pump 10B, the voltage isolation devices 14 may generally mitigate charge or discharge of the stage capacitances 16 between cycles of their respective clock signal CLK1 or CLK2. Cross-coupled transistors (e.g., p-type field effect transistors) $18_1$ and $18_2$ may be included to discharge their respective stage capacitance $16_1$ and $16_2$ while their respective clock signal CLK1 and CLK2 is logic high (e.g., due to the capacitive effect of the logic low level of the complementary clock signal), and to isolate their respective stage capacitance $16_1$ and $16_2$ when their respective clock signal CLK1 and CLK2 transitions to logic low. Thus, the charge pump 10B may progressively remove charge from the capacitance component of each stage, and can produce a decreasing voltage level.

The efficiency of the voltage isolation devices to pass the developed voltage can greatly affect the magnitude of the developed voltage and the power requirements of the voltage generation circuit. For example, where the voltage isolation device is a diode-connected transistor, the gate of the transistor generally needs to be boosted at least a threshold voltage beyond the voltage to be passed. Such boosting is often referred to as Vt cancellation. Various embodiments described herein employ low-pass and high-pass filter characteristics in voltage isolation devices to facilitate Vt cancellation. Embodiments will be discussed in the context of a semiconductor memory, but it will be understood that voltage generation circuits having voltage isolation devices of various embodiments could be utilized in a variety of integrated circuit devices.

Figure 1:
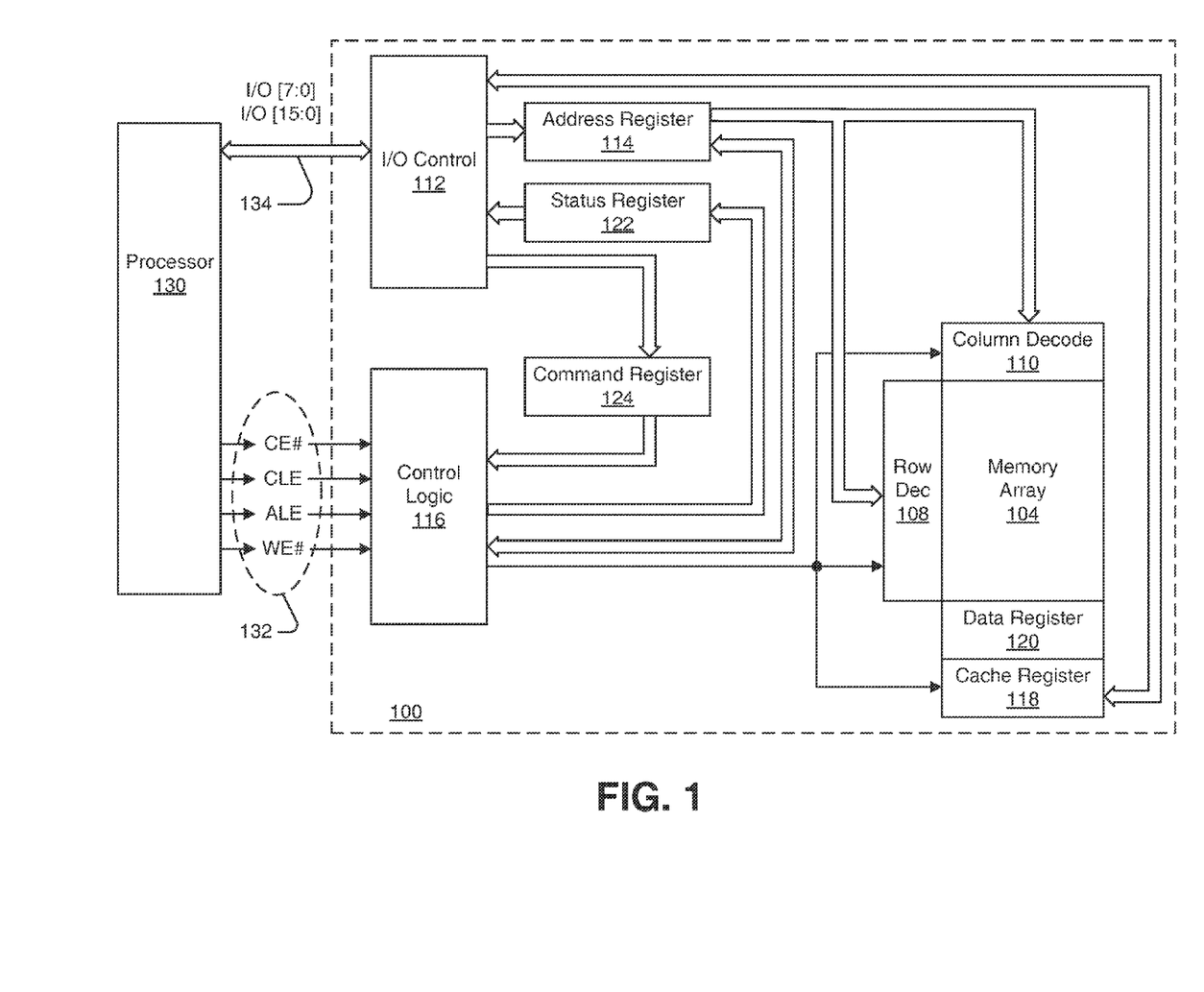
FIG. 1 is a simplified block diagram of a memory device in communication with a processor as part of an electronic system, according to an embodiment.

FIG. 1 is a simplified block diagram of a first apparatus, in the form of a memory device 100, in communication with a second apparatus, in the form of a processor 130, as part of a third apparatus, in the form of an electronic system, according to an embodiment. Some examples of electronic systems include personal computers, personal digital assistants (PDAs), digital cameras, digital media players, digital recorders, games, appliances, vehicles, wireless devices, cellular telephones and the like. The processor 130, e.g., a controller external to the memory device 100, may be a memory controller or other external host device. Voltage generation circuits may be utilized as components of the memory device 100 and/or processor 130.

Memory device 100, as an example of an integrated circuit device, includes an array of memory cells 104 logically arranged in rows and columns. Memory cells of a logical row are typically coupled to the same access line (commonly referred to as a word line) while memory cells of a logical column are typically selectively coupled to the same data line (commonly referred to as a bit line). A single access line may be associated with more than one logical row of memory cells and a single data line may be associated with more than one logical column. Memory cells (not shown in FIG. 1) of at least a portion of array of memory cells 104 are capable of being programmed to one of at least two data states.

A row decode circuitry 108 and a column decode circuitry 110 are provided to decode address signals. Address signals are received and decoded to access the array of memory cells 104. As one example, voltage generation circuits of various embodiments might be utilized to generate voltages used by the row decode circuitry 108 to apply to access lines during access operations on the array of memory cells 104. Memory device 100 also includes input/output (I/O) control circuitry 112 to manage input of commands, addresses and data to the memory device 100 as well as output of data and status information from the memory device 100. An address register 114 is in communication with I/O control circuitry 112 and row decode circuitry 108 and column decode circuitry 110 to latch the address signals prior to decoding. A command register 124 is in communication with I/O control circuitry 112 and control logic 116 to latch incoming commands.

An internal controller (e.g., control logic 116) controls access to the array of memory cells 104 in response to the commands and generates status information for the external processor 130. The control logic 116 is in communication with row decode circuitry 108 and column decode circuitry 110 to control the row decode circuitry 108 and column decode circuitry 110 in response to the addresses.

Control logic 116 is also in communication with a cache register 118. Cache register 118 latches data, either incoming or outgoing, as directed by control logic 116 to temporarily store data while the array of memory cells 104 is busy writing or reading, respectively, other data. During a program operation (e.g., write operation), data may be passed from the cache register 118 to data register 120 for transfer to the array of memory cells 104; then new data may be latched in the cache register 118 from the I/O control circuitry 112. During a read operation, data may be passed from the cache register 118 to the I/O control circuitry 112 for output to the external processor 130; then new data may be passed from the data register 120 to the cache register 118. A status register 122 is in communication with I/O control circuitry 112 and control logic 116 to latch the status information for output to the processor 130.

Memory device 100 receives control signals at control logic 116 from processor 130 over a control link 132. The control signals may include a chip enable CE#, a command latch enable CLE, an address latch enable ALE, and a write enable WE#. Additional control signals (not shown) may be further received over control link 132 depending upon the nature of the memory device 100. Memory device 100 receives command signals (which represent commands), address signals (which represent addresses), and data signals (which represent data) from processor 130 over a multiplexed input/output (I/O) bus 134 and outputs data to processor 130 over I/O bus 134.

For example, the commands may be received over input/output (I/O) pins [7:0] of I/O bus 134 at I/O control circuitry 112 and written into command register 124. The addresses may be received over input/output (I/O) pins [7:0] of bus 134 at I/O control circuitry 112 and written into address register 114. The data may be received over input/output (I/O) pins [7:0] for an 8-bit device or input/output (I/O) pins [15:0] for a 16-bit device at I/O control circuitry 112 and written into cache register 118. The data are subsequently written into data register 120 for programming the array of memory cells 104. For another embodiment, cache register 118 may be omitted, and the data may be written directly into data register 120. Data may also be output over input/output (I/O) pins [7:0] for an 8-bit device or input/output (I/O) pins [15:0] for a 16-bit device.

It will be appreciated by those skilled in the art that additional circuitry and signals can be provided, and that the memory device of FIG. 1 has been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Additionally, while specific I/O pins are described in accordance with popular conventions for receipt and output of the various signals, it is noted that other combinations or numbers of I/O pins may be used in the various embodiments.

Figure 2:
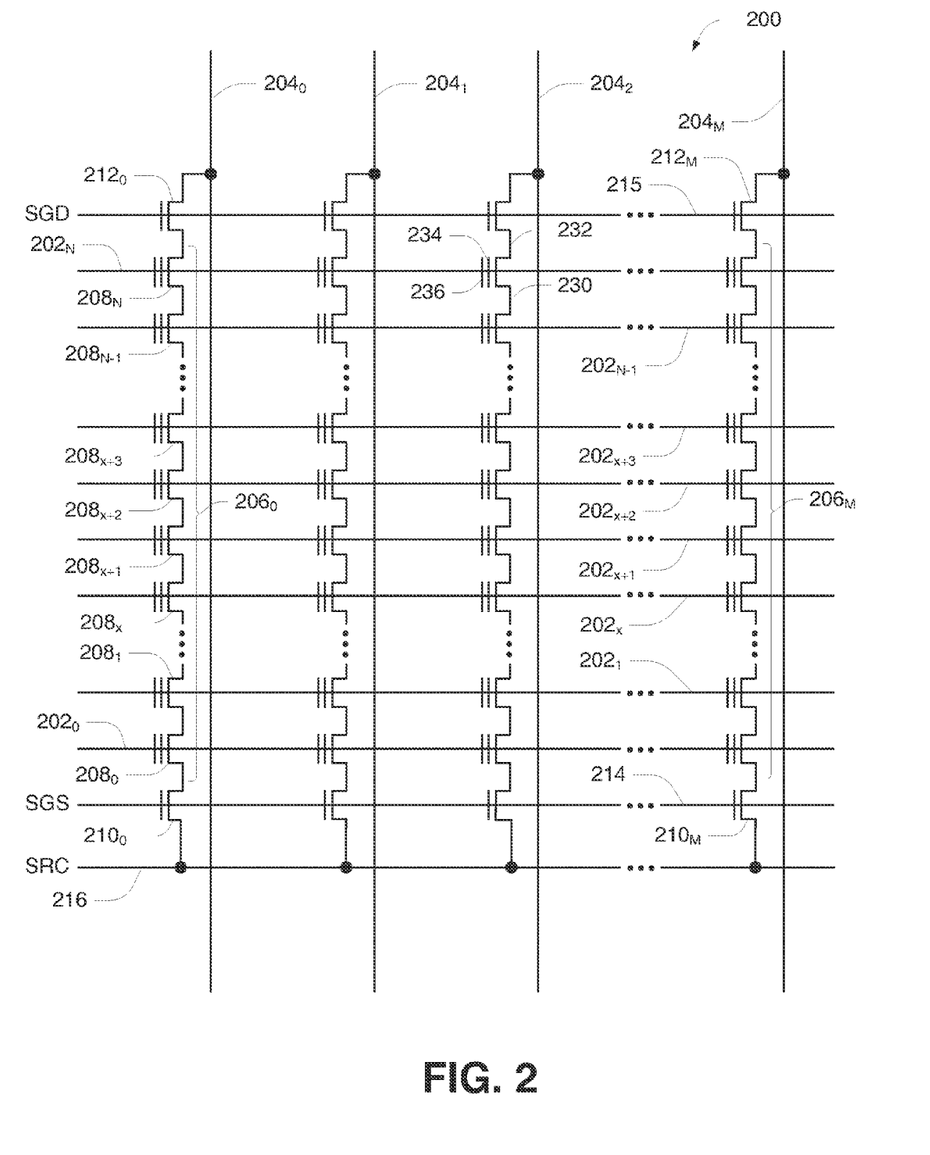
FIG. 2 is a schematic of a portion of an array of memory cells as could be used in a memory device of the type described with reference to FIG. 1.

FIG. 2 is a schematic of a NAND memory array 200, e.g., as a portion of array of memory cells 104. Memory array 200 includes access lines, such as word lines $202_0$ to $202_N$, and data lines, such as bit lines $204_0$ to $204_M$. The word lines 202 may be coupled to global access lines (e.g., global word lines), not shown in FIG. 2, in a many-to-one relationship. For some embodiments, memory array 200 may be formed over a semiconductor that, for example, may be conductively doped to have a conductivity type, such as a p-type conductivity, e.g., to form a p-well, or an n-type conductivity, e.g., to form an n-well.

Memory array 200 might be arranged in rows (each corresponding to a word line 202) and columns (each corresponding to a bit line 204). Each column may include a string of series-coupled memory cells, such as one of NAND strings $206_0$ to $206_M$. Each NAND string 206 might be coupled to a common source 216 and might include memory cells $208_0$ to $208_N$. The memory cells 208 represent non-volatile memory cells for storage of data. The memory cells 208 of each NAND string 206 might be connected in series between a select transistor 210 (e.g., a field-effect transistor), such as one of the select transistors $210_0$ to $210_M$ (e.g., that may be source select transistors, commonly referred to as select gate source), and a select transistor 212 (e.g., a field-effect transistor), such as one of the select transistors $212_0$ to $212_M$ (e.g., that may be drain select transistors, commonly referred to as select gate drain). Select transistors $210_0$ to $210_M$ might be commonly coupled to a select line 214, such as a source select line, and select transistors $212_0$ to $212_M$ might be commonly coupled to a select line 215, such as a drain select line.

A source of each select transistor 210 might be connected to common source 216. The drain of each select transistor 210 might be connected to a memory cell $208_0$ of the corresponding NAND string 206. For example, the drain of select transistor $210_0$ might be connected to memory cell $208_0$ of the corresponding NAND string $206_0$. Therefore, each select transistor 210 might be configured to selectively couple a corresponding NAND string 206 to common source 216. A control gate of each select transistor 210 might be connected to select line 214.

The drain of each select transistor 212 might be connected to the bit line 204 for the corresponding NAND string 206. For example, the drain of select transistor $212_0$ might be connected to the bit line $204_0$ for the corresponding NAND string $206_0$. The source of each select transistor 212 might be connected to a memory cell $208_N$ of the corresponding NAND string 206. For example, the source of select transistor $212_0$ might be connected to memory cell $208_N$ of the corresponding NAND string $206_0$. Therefore, each select transistor 212 might be configured to selectively couple a corresponding NAND string 206 to a corresponding bit line 204. A control gate of each select transistor 212 might be connected to select line 215.

The memory array in FIG. 2 might be a quasi-two-dimensional memory array and might have a generally planar structure, e.g., where the common source 216, strings 206 and bit lines 204 extend in substantially parallel planes. Alternatively, the memory array in FIG. 2 might be a three-dimensional memory array, e.g., where strings 206 may extend substantially perpendicular to a plane containing the common source 216 and to a plane containing the bit lines 204 that may be substantially parallel to the plane containing the common source 216.

Typical construction of memory cells 208 includes a data-storage structure 234 (e.g., a floating gate, charge trap, etc.) that can determine a data value of the cell (e.g., through changes in threshold voltage), and a control gate 236, as shown in FIG. 2. In some cases, memory cells 208 may further have a defined source 230 and a defined drain 232. Memory cells 208 have their control gates 236 coupled to (and in some cases form) a word line 202.

A column of the memory cells 208 is a NAND string 206 or a plurality of NAND strings 206 coupled to a given bit line 204. A row of the memory cells 208 are memory cells 208 commonly coupled to a given word line 202. A row of memory cells 208 can, but need not include all memory cells 208 commonly coupled to a given word line 202. Rows of memory cells 208 may often be divided into one or more groups of physical pages of memory cells 208, and physical pages of memory cells 208 often include every other memory cell 208 commonly coupled to a given word line 202. For example, memory cells 208 commonly coupled to word line $202_N$ and selectively coupled to even bit lines 204 (e.g., bit lines $204_0$, $204_2$, $204_4$, etc.) may be one physical page of memory cells 208 (e.g., even memory cells) while memory cells 208 commonly coupled to word line $202_N$ and selectively coupled to odd bit lines 204 (e.g., bit lines $204_1$, $204_3$, $204_5$, etc.) may be another physical page of memory cells 208 (e.g., odd memory cells). Although bit lines $204_3$-$204_5$ are not expressly depicted in FIG. 2, it is apparent from the figure that the bit lines 204 of the array of memory cells 200 may be numbered consecutively from bit line $204_0$ to bit line $204_M$. Other groupings of memory cells 208 commonly coupled to a given word line 202 may also define a physical page of memory cells 208. For certain memory devices, all memory cells commonly coupled to a given word line might be deemed a physical page. The portion of a physical page (which, in some embodiments, could still be the entire row) that is read during a single read operation or programmed during a program operation (e.g., an upper or lower page memory cells) might be deemed a logical page.

Although the example of FIG. 2 is discussed in conjunction with NAND flash, the embodiments described herein are not limited to a particular array architecture or structure, and can include other structures (e.g., cross-point memory, DRAM, etc.) and other architectures (e.g., AND arrays, NOR arrays, etc.).

Figure 3A:
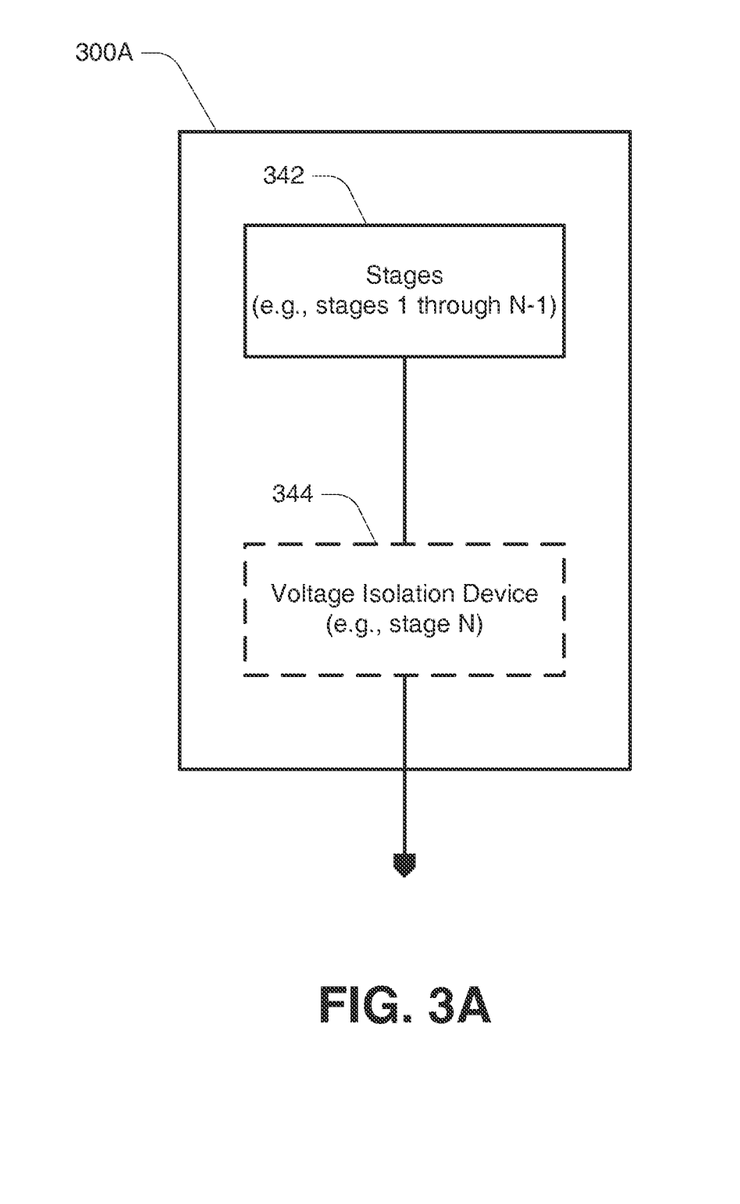
FIG. 3A is a simplified block diagram of a voltage generation circuit in accordance with an embodiment.

FIG. 3A is a schematic of a voltage generation circuit 300A in accordance with an embodiment. Voltage generation circuit 300A may include one or more stages 342, e.g., stages 1 through N−1, where N is some integer equal to or greater than two. Voltage generation circuit 300A may further include a voltage isolation device 344 as an Nth stage. Multiple stages 342 may be connected in series, such as described with reference to FIG. 6A, or they may be connected in parallel, such as described with reference to FIG. 6B. As described with reference to FIGS. 6A and 6B, each stage 342 might include a capacitance and a voltage isolation device. A voltage isolation device of a stage 342 may have the same structure as optional voltage isolation device 344. At least one voltage isolation device of the voltage generation circuit 300A is in accordance with an embodiment.

Figure 3B:
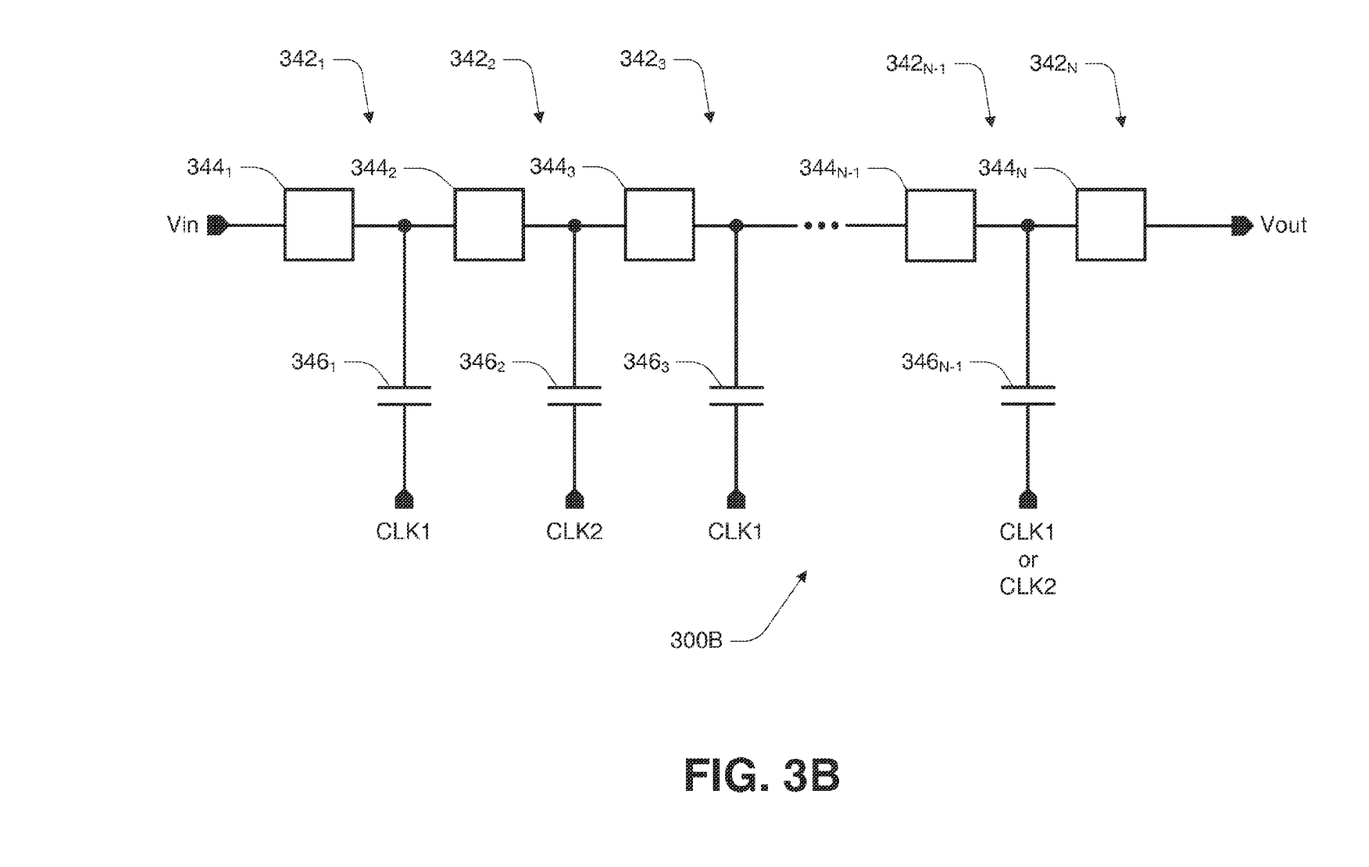
FIGS. 3B-3C are schematics of voltage generation circuits in accordance with embodiments.

FIG. 3B is a schematic of a voltage generation circuit 300B in accordance with an embodiment. Voltage generation circuit 300B is illustrated as a positive charge pump, e.g., developing an increasing voltage level at its output.

Charge pump 300B receives an input voltage Vin, which might be Vcc for example. A first clock signal CLK1 may be received at one input of alternating stage capacitances, e.g., stage capacitances $346_1$, $346_3$, $346_5$, etc., while a second clock signal CLK2 may be received at one input of alternating stage capacitances, e.g., stage capacitances $346_2$, $346_4$, $346_6$, etc. While stage capacitances $346_4$, $346_5$ and $346_6$ are not directly shown in FIG. 3B, it is apparent from the numbering of stage capacitances 346 from 1 to N. Clock signals CLK1 and CLK2 would generally have opposite phases and similar (e.g., the same) amplitudes, such as described with reference to FIGS. 6A-6B, and may correspond to the amplitude of a supply voltage.

Charge pump 300B may include N stages 342. The stages $342_1$ through $342_N$ may each include a stage capacitance 346. The stages $342_1$ through $342_N$ may further include a voltage isolation device 344 in accordance with an embodiment. The Nth stage $342_N$ of the charge pump 300B may contain voltage isolation device $344_N$ without a corresponding stage capacitance 346. The voltage isolation device $344_N$ may be included to protect a load, e.g., circuitry configured to receive the output voltage Vout. In the charge pump 300B, the voltage isolation devices 344 may generally mitigate charge or discharge of the stage capacitances 346 between cycles of their respective clock signal CLK1 or CLK2. Thus, the charge pump 300B may progressively store more charge on the capacitance component of each stage, and several such stages being placed together in the charge pump 300B can produce an increasing voltage level.

Figure 3C:
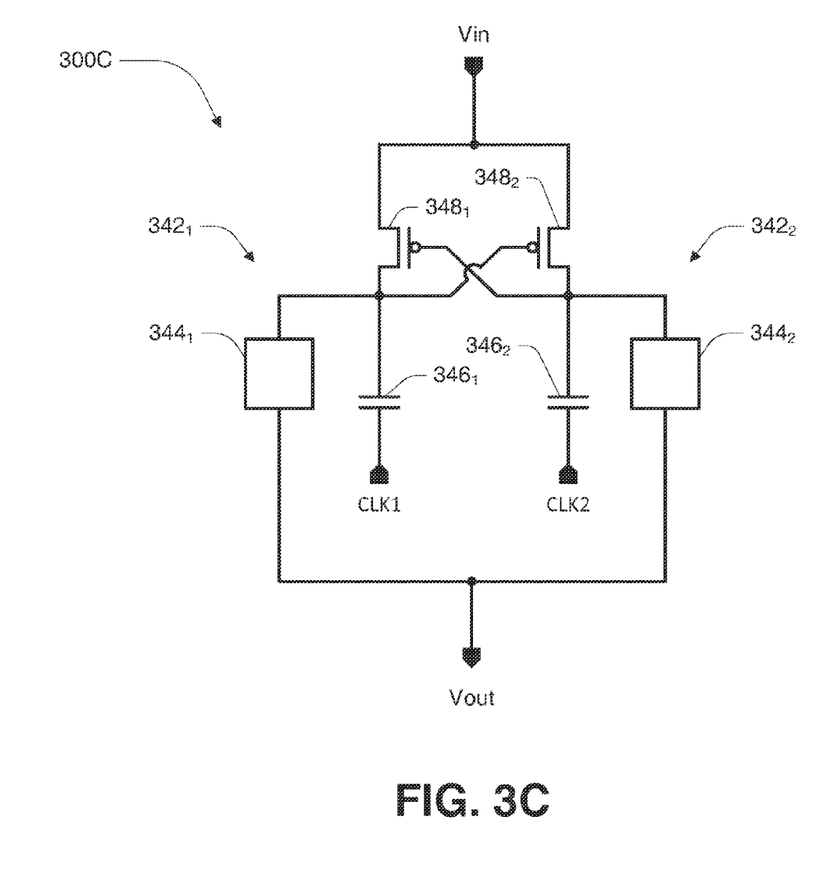

FIG. 3C is a schematic of a voltage generation circuit 300C in accordance with an embodiment. Voltage generation circuit 300C is illustrated as a negative charge pump, e.g., developing a decreasing voltage level at its output.

Charge pump 300C receives an input voltage Vin. A first clock signal CLK1 may be received at one input of stage capacitance $346_1$, while a second clock signal CLK2 may be received at one input of stage capacitance $346_2$. Clock signals CLK1 and CLK2 would generally have opposite phases and similar (e.g., the same) amplitudes, such as described with reference to FIGS. 6A-6B, and may correspond to the amplitude of a supply voltage.

Charge pump 300C might include two parallel stages 342. The stages $342_1$ and $342_2$ may each include a stage capacitance $346_1$ and $346_2$, respectively. The stages $342_1$ and $342_2$ may further include a voltage isolation device $344_1$ and $344_2$, respectively, in accordance with an embodiment. The voltage isolation devices 344 may be included to protect a load, e.g., circuitry configured to receive the output voltage Vout. In the charge pump 300C, the voltage isolation devices 344 may generally mitigate charge or discharge of the stage capacitances 346 between cycles of their respective clock signal CLK1 or CLK2. Cross-coupled transistors (e.g., p-type field effect transistors) $348_1$ and $348_2$ may be included to discharge their respective stage capacitance $346_1$ and $346_2$ while their respective clock signal CLK1 and CLK2 is logic high (e.g., due to the capacitive effect of the logic low level of the complementary clock signal), and to isolate their respective stage capacitance $346_1$ and $346_2$ when their respective clock signal CLK1 and CLK2 transitions to logic low. Thus, the charge pump 300C may progressively remove charge from the capacitance component of each stage, and can produce a decreasing voltage level.

Figure 4A:
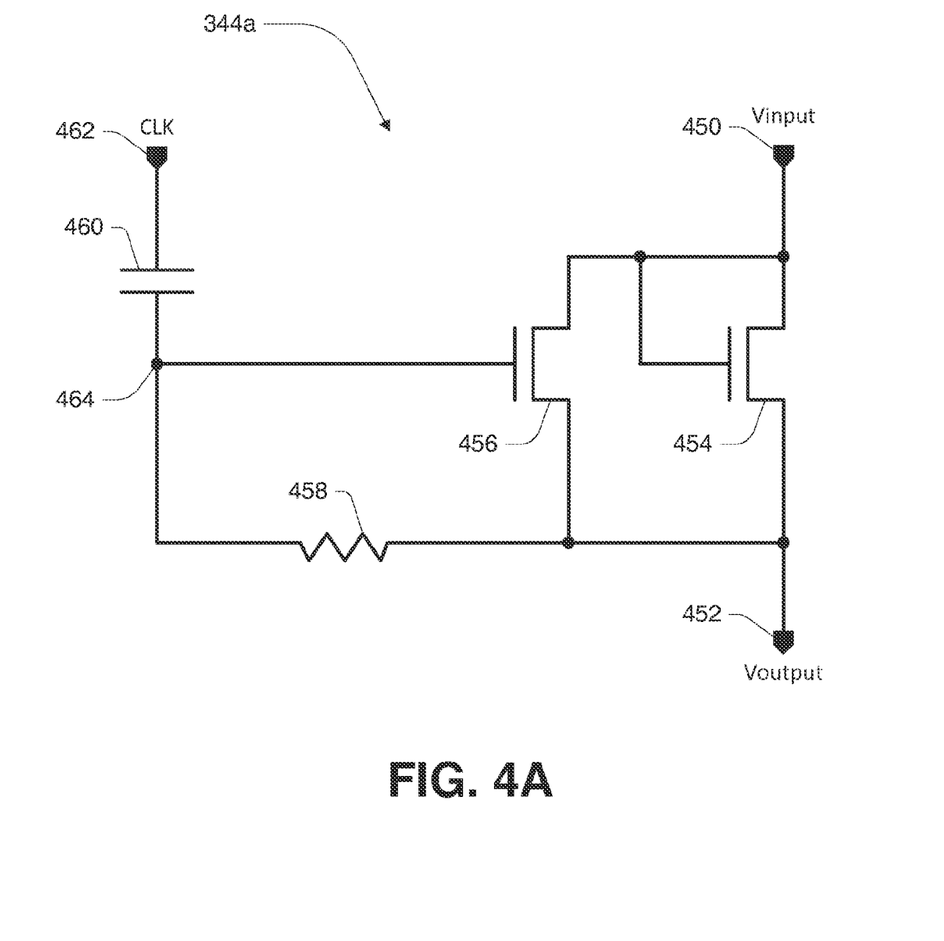
FIGS. 4A-4B are schematics of voltage isolation devices in accordance with embodiments.

FIG. 4A is a schematic of a voltage isolation device 344a in accordance with an embodiment, such as might be used in a voltage generation circuit of FIGS. 3A-3C, for example. The voltage isolation device 344a may include an input node 450 connected to receive an input voltage of a voltage generation circuit or an output node of a voltage isolation device of a prior stage of a voltage generation circuit. The voltage isolation device 344a may further include an output node 452, such as might be provided to a load or an input node of a voltage isolation device of a subsequent state of a voltage generation circuit. The voltage isolation device 344a may be configured to pass a voltage between the input node 450 and the output node 452. The voltage isolation device 344a may include a first field-effect transistor (FET) 454 and a second FET 456. The FETs 454 and 456 may be n-type FETs (as depicted) or p-type FETs. The FETS 454 and 456 may further be of the same size, e.g., the same channel length and width. The FETs 454 and 456 may have a first source/drain node connected to the input node 450 and a second source/drain node connected to the output node 452. The FET 454 may further have a control gate connected to the input node 450, e.g., as a diode-connected FET. The FET 456 may further have a control gate connected to a node 464.

The voltage isolation device 344a may further include a resistance (e.g., resistor) 458 connected between the output node 452 and the node 464. The voltage isolation device 344a may further include a capacitance (e.g., a capacitor) 460 having a first electrode connected to a clock signal node 462 to receive a clock signal CLK, and a second electrode connected to the node 464.

The voltage isolation device 344a provides a first current path between the input node 450 and the output node 452 through a diode, e.g., diode-connected FET 454. The voltage isolation device 344a further provides a second current path between the input node 450 and the output node 452 through a gate, e.g., FET 456. The gate of the second current path is responsive to the contribution of a low-pass filter, e.g., resistance 458 between the output node 452 and the control gate of the FET 456, and a high-pass filter, e.g., capacitance 460 between the clock signal node 462 and the control gate of the FET 456.

Through the contribution of the low-pass filter characteristics of the path between the output node 452 and the node 464 through the resistance 458, absent any contribution of the capacitance 460, the node 464 would tend to pull up to a voltage level of the output node 452. Through the contribution of the high-pass filter characteristics of the path across the capacitance 460 from the clock signal node 462 to the node 464, absent any contribution through the resistance 458, the node 464 would tend to transition an amplitude of the clock signal CLK during its logic high phase and return to a base level during the logic low phase of the clock signal CLK. In combination, the node 464, at steady-state, may approach a voltage level of the output node 452 during the logic low phase of the clock signal CLK, and, during the logic high phase of the clock signal CLK, approach a voltage level equal to the voltage level of the output node 452 plus the amplitude of the clock signal CLK. The threshold voltage of a typical FET may be around 0.8V. Using a clock signal CLK with an amplitude of Vcc, presently around 2.5V-3.3V, the overdrive voltage applied to the control gate of the FET 456 during the logic high phase of the clock signal CLK is sufficient to overcome its threshold voltage, and charge that cannot be passed by FET 454 may be passed by FET 456. During the logic low phase of the clock signal CLK, FET 456 will generally deactivate, thus mitigating charge loss. A version of the voltage isolation device 344a using p-type FETs could operate in a similar fashion, but result in the FET 456 activating during the logic low phase of the clock signal CLK.

Figure 4B:
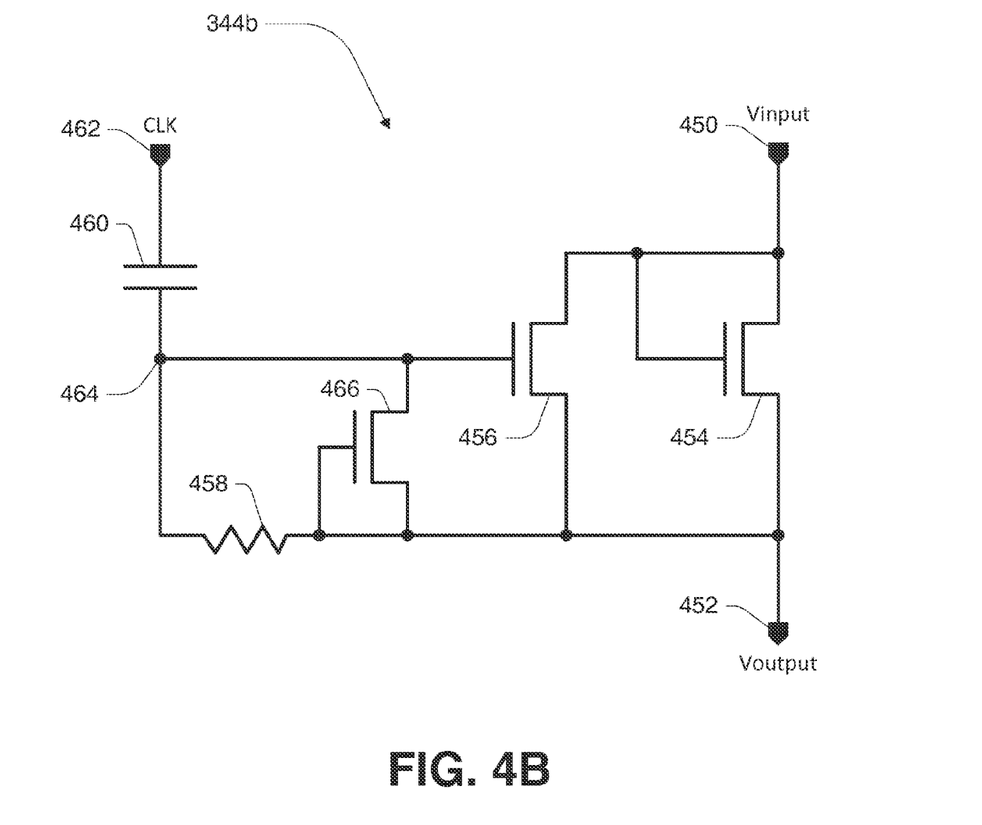

FIG. 4B is a schematic of a voltage isolation device 344b in accordance with another embodiment, such as might be used in a voltage generation circuit of FIGS. 3A-3C, for example. The voltage isolation device 344b may be as generally described with reference to the voltage isolation device 344a, but further including a third FET 466 having a first source/drain node and a control gate connected to the output node 452 (e.g., as a diode-connected FET) and a second source/drain node connected to the node 464. The third FET 466 may be of a same type as the FETs 454 and 456. The third FET 466 may further be of a same size as the FETs 454 and 456. The third FET 466 may aid in initialization of the voltage isolation device 344b by passing additional current between the output node 452 and the node 464 as power is applied to the voltage isolation device 344b, yet mitigating that current flow as a voltage level of the node 464 approaches a voltage level of the output node 452. The gating of the second current path of voltage isolation device 344b is further responsive to the contribution of this diode, e.g., FET 466, between the output node 452 and the control gate of the FET 456.

Figure 5:
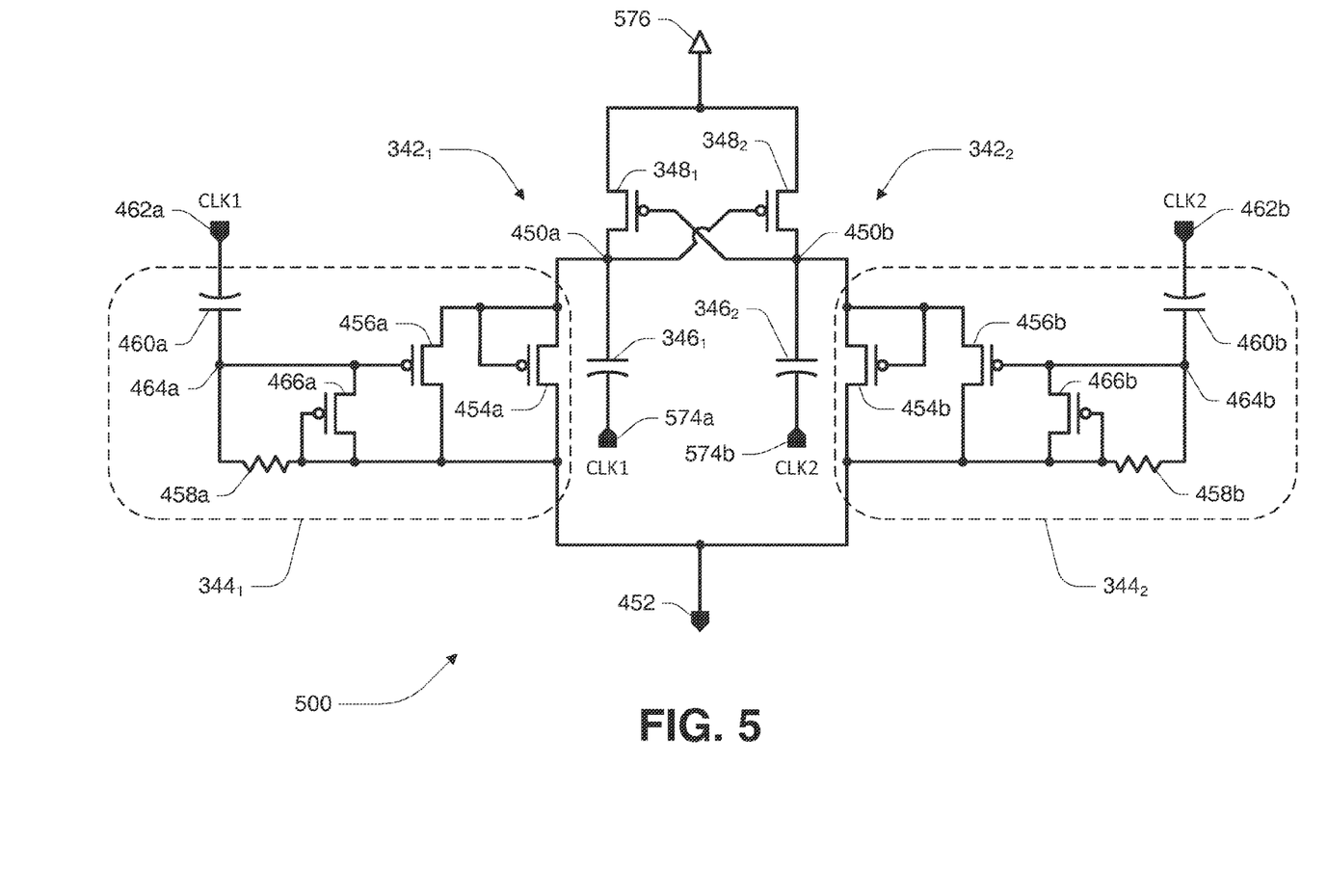
FIG. 5 is a schematic of a voltage generation circuit in accordance with an embodiment.

FIG. 5 is a schematic of a voltage generation circuit 500 in accordance with an embodiment. The voltage generation circuit 500 is depicted as a negative charge pump having two parallel stages $342_1$ and $342_2$.

Voltage generation circuit 500 is connected to receive an input voltage at a reference node 576. The reference node 576 may be connected to receive a reference potential, e.g., Vss or a ground potential. The stages $342_1$ and $342_2$ may each include a stage capacitance $346_1$ and $346_2$, respectively. Stage capacitance $346_1$ may be connected to a clock signal node 574a at one electrode to receive a first clock signal CLK1, and stage capacitance $346_2$ may be connected to a clock signal node 574b at one electrode to receive a second clock signal CLK2. Clock signals CLK1 and CLK2 would generally have opposite phases, the same frequency, and similar (e.g., the same) amplitudes, such as described with reference to FIGS. 6A-6B, and may correspond to the amplitude of a supply voltage, e.g., Vcc. Stage capacitance $346_1$ may be connected to a node 450a at its other electrode and stage capacitance $346_2$ may be connected to a node 450b at its other electrode.

The stages $342_1$ and $342_2$ may further include a voltage isolation device $344_1$ and $344_2$, respectively, in accordance with embodiments. Although the voltage isolation devices 344 of FIG. 5 are depicted to use a structure of the type described with reference to FIG. 4B, they could alternatively use a structure of the type described with reference to FIG. 4A. The voltage isolation devices 344 may be included to protect a load, e.g., circuitry configured to receive the output voltage of output node 452. In voltage generation circuit 500, the voltage isolation devices 344 may generally mitigate charge or discharge of the stage capacitances 346 between cycles of their respective clock signal CLK1 or CLK2. Cross-coupled transistors (e.g., p-type field effect transistors) $348_1$ and $348_2$ may be included to discharge their respective stage capacitance $346_1$ and $346_2$ while their respective clock signal CLK1 and CLK2 is logic high (e.g., due to the capacitive effect of the logic low level of the complementary clock signal), and to isolate their respective stage capacitance $346_1$ and $346_2$ when their respective clock signal CLK1 and CLK2 transitions to logic low. FET $348_1$ may have a first source/drain node connected to the reference node 576, a second source/drain node connected to the node 450a, and a control gate connected to the node 450b. FET $348_2$ may have a first source/drain node connected to the reference node 576, a second source/drain node connected to the node 450b, and a control gate connected to the node 450a. Thus, the voltage generation circuit 500 may progressively remove charge from the capacitance component of each stage, and can produce a decreasing voltage level at output node 452.

The voltage isolation device $344_1$ may include a first field-effect transistor (FET) 454a and a second FET 456a. The FETs 454a and 456a are p-type FETs in the example of FIG. 5. The FETs 454a and 456a may further be of the same size, e.g., the same channel length and width. The FETs 454a and 456a may have a first source/drain node connected to the node 450a and a second source/drain node connected to the output node 452. The FET 454a may further have a control gate connected to the node 450a, e.g., as a diode-connected FET. The FET 456a may further have a control gate connected to a node 464a. The voltage isolation device $344_1$ may further include a third FET 466a having a first source/drain node and a control gate connected to the output node 452 (e.g., as a diode-connected FET) and a second source/drain node connected to the node 464a. The third FET 466 may be of a same type as the FETs 454a and 456a. The third FET 466a may further be of a same size as the FETs 454a and 456a.

The voltage isolation device $344_1$ may further include a resistance (e.g., resistor) 458a connected between the output node 452 and the node 464a. The voltage isolation device $344_1$ may further include a capacitance (e.g., a capacitor) 460a having a first electrode connected to a clock signal node 462a to receive a clock signal CLK1, and a second electrode connected to the node 464a. The capacitance 460a may have a capacitance value that is orders of magnitude (e.g., two orders of magnitude) smaller than its corresponding stage capacitance $346_1$. As an example, the capacitance 460a might have a capacitance value of 0.5 pF while the stage capacitance $346_1$ might have a capacitance value of 120 pF. The clock signal node 462a is depicted to receive the same clock signal CLK1 as the first stage capacitance $346_1$.

However, the clock signal node 462a may be connected to receive a clock signal of the same frequency and phase, but different amplitude.

The voltage isolation device $344_2$ may include a first field-effect transistor (FET) 454b and a second FET 456b. The FETs 454b and 456b are p-type FETs in the example of FIG. 5. The FETs 454b and 456b may further be of the same size, e.g., the same channel length and width. The FETs 454b and 456b may have a first source/drain node connected to the node 450b and a second source/drain node connected to the output node 452. The FET 454b may further have a control gate connected to the node 450b, e.g., as a diode-connected FET. The FET 456b may further have a control gate connected to a node 464b. The voltage isolation device $344_2$ may further include a third FET 466b having a first source/drain node and a control gate connected to the output node 452 (e.g., as a diode-connected FET) and a second source/drain node connected to the node 464b. The third FET 466b may be of a same type as the FETs 454b and 456b. The third FET 466b may further be of a same size as the FETs 454b and 456b.

The voltage isolation device $344_2$ may further include a resistance (e.g., resistor) 458b connected between the output node 452 and the node 464b. The voltage isolation device $344_2$ may further include a capacitance (e.g., a capacitor) 460b having a first electrode connected to a clock signal node 462b to receive a clock signal CLK2, and a second electrode connected to the node 464b. The capacitance 460b may have a capacitance value that is orders of magnitude (e.g., two orders of magnitude) smaller than its corresponding stage capacitance $346_2$. As an example, the capacitance 460b might have a capacitance value of 0.5 pF while the stage capacitance $346_2$ might have a capacitance value of 120 pF. The clock signal node 462b is depicted to receive the same clock signal CLK2 as the second stage capacitance $346_2$. However, the clock signal node 462b may be connected to receive a clock signal of the same frequency and phase, but different amplitude.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments.

What is claimed is:

1. A voltage generation circuit, comprising:
   a stage capacitance; and
   a voltage isolation device connected to the stage capacitance, the voltage isolation device comprising:
      a first current path between an input and an output of the voltage isolation device through a diode; and
      a second current path between the input and the output of the voltage isolation device through a gate;
      wherein the gate is responsive to a voltage level developed in response to a contribution of a low-pass filter between the output of the voltage isolation device and the gate, and to a contribution of a high-pass filter between a clock signal node and the gate.

2. The voltage generation circuit of claim 1, wherein the voltage generation circuit is a multi-stage voltage generation circuit, and wherein the stage capacitance and the voltage isolation device are portions of one stage of the multi-stage voltage generation circuit.

3. The voltage generation circuit of claim 2, wherein the stage capacitance and the voltage isolation device are portions of a last stage of the multi-stage voltage generation circuit, and wherein the output of the voltage isolation device is an output of the voltage generation circuit.

4. The voltage generation circuit of claim 2, wherein the output of the voltage isolation device is an input of a different voltage isolation device of a different, subsequent stage of the multi-stage voltage generation circuit.

5. The voltage generation circuit of claim 4, wherein the input of the voltage isolation device is an output of a different voltage isolation device of a different, prior stage of the multi-stage voltage generation circuit.

6. The voltage generation circuit of claim 1, wherein the gate is further responsive to a voltage level developed in response to a contribution of a diode between the output of the voltage isolation device and the gate.

7. A voltage generation circuit, comprising:
   a stage capacitance; and
   a voltage isolation device connected to the stage capacitance, the voltage isolation device comprising:
      a first field-effect transistor (FET) having a first source/drain node connected to an input of the voltage isolation device, a second source/drain node connected to an output of the voltage isolation device, and a control gate connected to the input of the voltage isolation device;
      a second FET having a first source/drain node connected to the input of the voltage isolation device, a second source/drain node connected to the output of the voltage isolation device, and a control gate;
      a resistance connected between the output of the voltage isolation device and the control gate of the second FET; and
      a capacitance connected between a clock signal node and the control gate of the second FET.

8. The voltage generation circuit of claim 7, further comprising a third FET having a first source/drain node connected to the output of the voltage isolation device, a second source/drain node connected to the control gate of the second FET, and a control gate connected to the output of the voltage isolation device.

9. The voltage generation circuit of claim 7, wherein the voltage generation circuit is a multi-stage voltage generation circuit, and wherein the stage capacitance and the voltage isolation device are portions of one stage of the multi-stage voltage generation circuit.

10. The voltage generation circuit of claim 9, wherein the stages are connected in series.

11. The voltage generation circuit of claim 10, wherein the first FET and the second FET are n-type FETs.

12. The voltage generation circuit of claim 9, wherein the stages are connected in parallel.

13. The voltage generation circuit of claim 12, wherein the first FET and the second FET are p-type FETs.

14. The voltage generation circuit of claim 7, wherein the stage capacitance has a first electrode connected to the voltage isolation device and a second electrode connected to a second clock signal node, and wherein the clock signal node and the second clock signal node are each connected to receive a clock signal having a same phase and a same frequency.

15. The voltage generation circuit of claim 7, wherein the capacitance connected between the clock signal node and the control gate of the second FET has a capacitance value that is orders of magnitude smaller than a capacitance value of the stage capacitance.

16. The voltage generation circuit of claim 15, wherein the capacitance value of the capacitance connected between the clock signal node and the control gate of the second FET is two orders of magnitude smaller than the capacitance value of the stage capacitance.

17. A voltage generation circuit, comprising:
a reference node;
an output node;
a first stage capacitance having a first electrode connected to a first clock signal node and a second electrode connected to a first node;
a second stage capacitance having a first electrode connected to a second clock signal node and a second electrode connected to a second node;
a first voltage isolation device connected to the first stage capacitance, the first voltage isolation device comprising:
  a first field-effect transistor (FET) having a first source/drain node connected to the first node, a second source/drain node connected to the output node, and a control gate connected to the first node;
  a second FET having a first source/drain node connected to the first node, a second source/drain node connected to the output node, and a control gate;
  a first resistance connected between the output node and the control gate of the second FET; and
  a first capacitance connected between a third clock signal node and the control gate of the second FET;
a second voltage isolation device connected to the second stage capacitance, the second voltage isolation device comprising:
  a third field-effect transistor (FET) having a first source/drain node connected to the second node, a second source/drain node connected to the output node, and a control gate connected to the second node;
  a fourth FET having a first source/drain node connected to the second node, a second source/drain node connected to the output node, and a control gate;
  a second resistance connected between the output node and the control gate of the fourth FET; and
  a second capacitance connected between a fourth clock signal node and the control gate of the fourth FET;
a fifth FET having a first source/drain node connected to the reference node, a second source/drain node connected to the first node, and a control gate connected to the second node; and
a sixth FET having a first source/drain node connected to the reference node, a second source/drain node connected to the second node, and a control gate connected to the first node.

18. The voltage generation circuit of claim 17, wherein the first FET, the second FET, the third FET, the fourth FET, the fifth FET and the sixth FET are p-type FETs.

19. The voltage generation circuit of claim 17, wherein the first voltage isolation device further comprises a seventh FET having a first source/drain node connected to the output node, a second source/drain node connected to the control gate of the second FET, and a control gate connected to the output node.

20. The voltage generation circuit of claim 19, wherein the second voltage isolation device further comprises an eighth FET having a first source/drain node connected to the output node, a second source/drain node connected to the control gate of the fourth FET, and a control gate connected to the output node.

21. The voltage generation circuit of claim 20, wherein the first FET, the second FET, the third FET, the fourth FET, the fifth FET, the sixth FET, the seventh FET and the eighth FET are p-type FETs.

22. The voltage generation circuit of claim 17, wherein the first clock signal node and the third clock signal node are connected to receive clock signals having a same phase and a same frequency, wherein the second clock signal node and the fourth clock signal node are connected to receive clock signals having a same phase and a same frequency, and wherein the first clock signal node and the second clock signal node are connected to receive clock signals having opposite phases.

23. The voltage generation circuit of claim 17, wherein the first clock signal node, the second clock signal node, the third clock signal node and the fourth clock signal node are connected to receive clock signals having a same amplitude.

* * * * *